US012388855B2

(12) United States Patent
Friedlander et al.

(10) Patent No.: US 12,388,855 B2
(45) Date of Patent: Aug. 12, 2025

(54) ANOMALY DETECTION AND MITIGATION USING DEVICE SUBPOPULATION PARTITIONING

(71) Applicant: Armis Security Ltd., Tel Aviv-Jaffa (IL)

(72) Inventors: Yuval Friedlander, Petah-Tiqwa (IL); Gil Ben Zvi, Hod Hasharon (IL); Ron Shoham, Tel Aviv (IL)

(73) Assignee: Armis Security Ltd., Tel Aviv-Jaffa (IL)

( * ) Notice: Subject to any disclaimer, the term of this patent is extended or adjusted under 35 U.S.C. 154(b) by 167 days.

(21) Appl. No.: 17/932,163

(22) Filed: Sep. 14, 2022

(65) Prior Publication Data

US 2024/0089277 A1 Mar. 14, 2024

(51) Int. Cl.
*H04L 29/06* (2006.01)
*G06F 18/23* (2023.01)
(Continued)

(52) U.S. Cl.
CPC .......... *H04L 63/1425* (2013.01); *G06F 18/23* (2023.01); *H04L 43/08* (2013.01)

(58) Field of Classification Search
CPC ... H04L 63/1425; H04L 43/08; H04L 41/147; H04L 41/145; H04L 43/022; H04L 43/16;
(Continued)

(56) References Cited

U.S. PATENT DOCUMENTS

| 8,836,536 B2 | 9/2014 | Marwah et al. |
| 10,187,401 B2 | 1/2019 | Machlica et al. |

(Continued)

FOREIGN PATENT DOCUMENTS

| CN | 111091068 A | 5/2020 |
| CN | 112802086 A | 5/2021 |

OTHER PUBLICATIONS

Peter J. Rousseeuw and Katrien Van Driessen. "A Fast Algorithm for the Minimum Covariance Determinant Estimator". Technometrics, 1999. pp. 212-223. vol. 41.3. U.S.

*Primary Examiner* — Joseph P Hirl
*Assistant Examiner* — Leynna Truvan
(74) *Attorney, Agent, or Firm* — Perkins Coie LLP (57) ABSTRACT

A system and method for anomaly detection. A method includes recursively partitioning a sample of device activity data including deterministic characteristics of a population of devices over iterations in order to create partitions. Each iteration includes determining a split density metric for a candidate subpopulation created by splitting a portion of the population with respect to a corresponding type of deterministic characteristic. The split density metric for the candidate subpopulation is determined based on a density value of the candidate subpopulation and a coverage value of the corresponding type of deterministic characteristic. The partitions include each candidate subpopulation meeting a split density metric threshold. A baseline for each of the partitions is established based on device activity for devices represented in device activity data of the partition. An anomaly is detected based on behavior of a device and the baseline established for a partition corresponding to the device.

19 Claims, 5 Drawing Sheets

(51) Int. Cl.
*H04L 9/40* (2022.01)
*H04L 43/08* (2022.01)

(58) Field of Classification Search
CPC ... H04L 12/417; G06F 18/23; G06F 18/2433;
G06F 21/56; G01V 1/48; G01V 1/50;
H04N 21/44222; H04N 21/454; H04N
1/00729; H04N 1/00742; H01J 2237/244;
H04M 7/0078; H04M 15/47; H04W
12/12; H05H 2277/1405; G03G
2215/00029; G06T 7/44; G11B 19/128;
G11B 23/0007
See application file for complete search history.

(56) References Cited

U.S. PATENT DOCUMENTS

| | | |
|---|---|---|
| 10,498,755 B2 | 12/2019 | Harris et al. |
| 11,363,031 B2 | 6/2022 | Carnes, III et al. |
| 2018/0181749 A1 | 6/2018 | Kolacinski et al. |
| 2019/0075013 A1* | 3/2019 | Garcia .................... H04L 43/16 |
| 2019/0124045 A1 | 4/2019 | Zong et al. |
| 2019/0166141 A1 | 5/2019 | Xu et al. |
| 2022/0391300 A1* | 12/2022 | Trapani ................... G06F 17/18 |

* cited by examiner

ANOMALY DETECTION AND MITIGATION USING DEVICE SUBPOPULATION PARTITIONING

TECHNICAL FIELD

The present disclosure relates generally to cybersecurity for connected devices, and more specifically to optimizing subpopulations of devices used for anomaly detection.

BACKGROUND

With the influx of connected devices being used across all industries, cybersecurity threats related to networks have become increasingly predominant and sophisticated. In part due to the wide variety of connected devices that now exist, traditional methods of cyber-threat detection which rely on signature-based rules face significant challenges in being effectively implemented.

Anomaly detection algorithms are typically designed to learn and capture the normal behavior of devices in networks and to attempt to identify deviations from a baseline representing such normal behavior. This allows for detecting and alerting on anomalies without prior knowledge of the characteristics of a particular cyber-attack.

A key task in reliable anomaly detection lies in determining the optimal subpopulation from among a vast array of types of devices in order to effectively represent the baseline of normal activity for a specific device. Failure to identify a baseline which accurately represents the normal behavior of the device will result in issues with anomaly detection such as false positives (i.e., identifying behavior as abnormal when it is in fact normal) and false negatives (i.e., identifying behavior as normal when it is actually abnormal). Consequently, failure to identify a baseline may impede or prevent mitigation of any cyber-threats, thereby increasing vulnerability of the network and the devices connected thereto.

The task of determining the optimal subpopulation against which a device should be compared has become increasingly challenging due to the wide spectrum of behavioral patterns related to different device attributes, particularly since the number of types of devices is increasing rapidly. This challenge is compounded by the fact that there is a tradeoff between selecting larger subpopulations which may demonstrate more statistical significance and smaller subpopulations which could better represent a specific type of device. Some existing solutions rely on operators of anomaly detection systems to manually contribute to device subpopulation selection, but these solutions which rely on human input require subjective judgments about grouping of devices into subpopulations and can therefore be subject to human bias and error which can hinder optimal selection of subpopulations.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for anomaly detection using device subpopulation partitioning. The method comprises: recursively partitioning a sample of device activity data over a plurality of iterations in order to create a plurality of partitions, wherein the device activity data includes deterministic characteristics of a population including a plurality of devices, wherein each iteration of recursively partitioning the sample further comprises: determining a split density metric for a candidate subpopulation of a plurality of subpopulations, wherein each of the plurality of subpopulations is created by splitting at least a portion of the population with respect to a corresponding type of deterministic characteristic, wherein the split density metric for the candidate subpopulation is determined based on a density value of the candidate subpopulation and a coverage value of the corresponding type of deterministic characteristic; and checking whether the candidate subpopulation meets a split density metric threshold by comparing the split density metric for the candidate subpopulation to the split density metric threshold, wherein the plurality of partitions includes each candidate subpopulation that meets the split density metric threshold; establishing a baseline for each of the plurality of partitions, wherein the baseline established for each partition is determined based on device activity for devices represented in a portion of the device activity data of the partition; and detecting an anomaly based on behavior of a device and the baseline established for a partition corresponding to the device.

Certain embodiments disclosed herein also include a non-transitory computer readable medium having stored thereon causing a processing circuitry to execute a process, the process comprising: recursively partitioning a sample of device activity data over a plurality of iterations in order to create a plurality of partitions, wherein the device activity data includes deterministic characteristics of a population including a plurality of devices, wherein each iteration of recursively partitioning the sample further comprises: determining a split density metric for a candidate subpopulation of a plurality of subpopulations, wherein each of the plurality of subpopulations is created by splitting at least a portion of the population with respect to a corresponding type of deterministic characteristic, wherein the split density metric for the candidate subpopulation is determined based on a density value of the candidate subpopulation and a coverage value of the corresponding type of deterministic characteristic; and checking whether the candidate subpopulation meets a split density metric threshold by comparing the split density metric for the candidate subpopulation to the split density metric threshold, wherein the plurality of partitions includes each candidate subpopulation that meets the split density metric threshold; establishing a baseline for each of the plurality of partitions, wherein the baseline established for each partition is determined based on device activity for devices represented in a portion of the device activity data of the partition; and detecting an anomaly based on behavior of a device and the baseline established for a partition corresponding to the device.

Certain embodiments disclosed herein also include a system for anomaly detection using device subpopulation partitioning. The system comprises: a processing circuitry; and a memory, the memory containing instructions that, when executed by the processing circuitry, configure the system to: recursively partition a sample of device activity data over a plurality of iterations in order to create a plurality of partitions, wherein the device activity data includes deterministic characteristics of a population including a plurality of devices, wherein the system is further configured to, at each iteration: determine a split density metric for a candidate subpopulation of a plurality of subpopulations, wherein each of the plurality of subpopulations is created by splitting at least a portion of the population with respect to a corresponding type of deterministic characteristic, wherein the split density metric for the candidate subpopulation is determined based on a density value of the candidate subpopulation and a coverage value of the corresponding type of deterministic characteristic; and check whether the candidate subpopulation meets a split density metric threshold by comparing the split density metric for the candidate subpopulation to the split density metric threshold, wherein the plurality of partitions includes each candidate subpopulation that meets the split density metric threshold; establish a baseline for each of the plurality of partitions, wherein the baseline established for each partition is determined based on device activity for devices represented in a portion of the device activity data of the partition; and detect an anomaly based on behavior of a device and the baseline established for a partition corresponding to the device.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

The various disclosed embodiments include a method and system for device subpopulation partitioning. The disclosed embodiments provide techniques for partitioning device activity data which can be used to provide representative samples that allow for more accurately predicting device attributes using the partitioned samples. This, in turn, allows for more accurately profiling devices and, consequently, for more accurately detecting abnormal behavior in devices. Consequently, such abnormalities in behavior may be mitigated in order to secure the devices or networks with which the devices communicate against potential cybersecurity threats.

In an embodiment, network device activity data including deterministic characteristics of devices communicating via one or more networks is sampled. Each sample represents a population of devices and is partitioned using a recursive partitioning process based on a split density metric calculated for a respective subpopulation, where the split density metric is a function of a density of the subpopulation and a coverage of a deterministic characteristic used to create the subpopulation. At each iteration, a portion of the device activity data is partitioned by splitting it with respect to a different deterministic characteristics such as a device attribute.

In a further embodiment, if any portions of the device activity data cannot be partitioned so as to meet a split density metric threshold based on deterministic characteristics, those portions which failed the split density metric threshold are partitioned using an alternative partitioning technique such as by applying a mixture model.

The resulting partitions are portions of the device activity data representing respective groups of devices which are expected to behave similarly based on commonalities in deterministic characteristics or based on center of mass determined with respect to device behavior. Baselines are established for the respective partitions. The baselines represent normal behavior for their respective partitions and are determined based on device behavior exhibited by devices represented in respective partitions. Device activity of a device is compared to a baseline corresponding to a partition representing a group of devices including that device in order to detect an anomaly in behavior for the device.

One or more mitigation actions may be performed in order to mitigate the detected anomaly.

The disclosed embodiments include various techniques by which data is split using deterministic characteristics of devices, i.e., characteristics which do not vary over time such as device type, manufacturer, model, and the like. In accordance with various disclosed embodiments, when creating partitions based on deterministic characteristics results in partitions which fail one or more criteria, data including the failing partitions may be repartitioned based on homogeneity of behavior among devices (where such behavior may vary over time). In other words, in various embodiments, it is first attempted to use deterministic characteristics to partition devices and, if deterministic characteristics alone are insufficient for any given portions of data, then statistical behavior modeling may be utilized to partition those portions.

In this regard, it has been identified that deterministic characteristics produce consistent results in terms of grouping devices that will behave similarly when used for partitioning but that, for some devices and/or combinations of device attributes, use of deterministic characteristics alone to partition a population may result in some subpopulations which do not effectively represent groups of devices having similar behavioral patterns. To this end, the split density metric described herein has been developed in order to provide a metric by which the effectiveness of deterministic characteristics for representing groups of devices that behave similarly can be objectively determined and utilized to partition devices into subpopulations which accurately reflect behavioral patterns of devices in those subpopulations. The disclosed embodiments, which utilize such a split density metric in order to determine whether to continue or cease splitting a given subpopulation, therefore allow for partitioning device activity data based on groupings of devices such that the partitioned data accurately represents groups of devices which behave similarly such that anomalies detected based on data partitioned as described herein are more accurately detected (e.g., with fewer false positives, false negatives, or both).

Also, by recursively iterating the partitioning as described herein and checking the disclosed density metric at each iteration, the partitions can be optimized to minimize the number of partitions required in order to accurately represent the respective subpopulations. As noted above, the partitions are created such that clusters of points are invariant to density, and the iterations are performed only until such density-invariant partitions are obtained or until one or more cessation criteria (e.g., exhaustion of all potential device attributes by which a subpopulation may be further split, failure to meet a minimum threshold number of devices, failure to meet a minimum threshold ratio of devices among the population, etc.). Consequently, the recursive iteration as described herein reduces processing power and processing time needed to perform the partitioning as compared to other solutions which might yield density-invariant partitions.

Further, since the number of partitions being created during partitioning is minimized to the minimal number that meets applicable density metric thresholds, subsequent processing of those partitions can be reduced. In other words, device attribute predictions may be generated by creating baselines for and applying prediction models to fewer partitions, thereby reducing the amount of processing needed to generated device attribute predictions for the samples.

Figure 1:
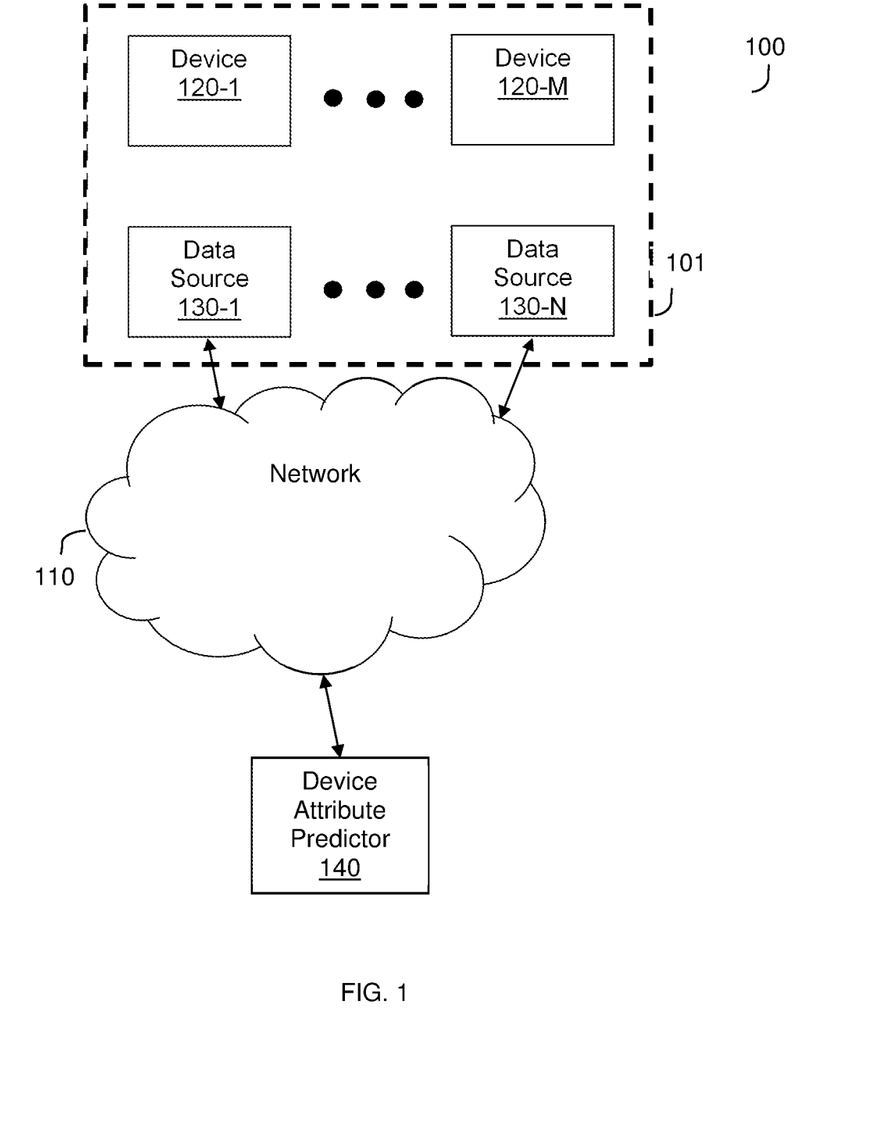
FIG. 1 is a network diagram utilized to describe various disclosed embodiments.

FIG. 1 shows an example network diagram 100 utilized to describe the various disclosed embodiments. In the example network diagram 100, data sources 130-1 through 130-N (hereinafter referred to as a data source 130 or as data sources 130) communicate with a device attribute predictor 140 via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The data sources 130 are deployed such that they can receive data from systems deployed in a network environment 101 in which devices 120-1 through 120-M (referred to as a device 120 or as devices 120) are deployed and communicate with each other, the data sources 130, other systems (not shown), combinations thereof, and the like. The data sources 130 may be, but are not limited to, databases, network scanners, both, and the like. Device activity data collected by or in the data sources 130 may be transmitted to the device attribute predictor 140 for use in predicting device attributes using subpopulation partitioning as described herein.

The device activity data at least includes values representing deterministic characteristics such as device attribute values of the devices 120 such as, but not limited to, device types, manufacturers, models, data sources, combinations thereof, and the like. The device activity data may further include, but is not limited to, query data (e.g., Domain Name System queries), unique network identifiers (e.g., Media Access Control addresses), traffic data (e.g., headers, payload data, etc.), combinations thereof, and the like. The device activity data may include any other data indicative of behavior of the devices 120 and, in particular, network behavior of the devices with respect to one or more networks such as the network 110. As discussed herein, such device activity data may be monitored in order to detect abnormalities as compared to some known normal behavior. The device activity data includes data related to various devices among the devices 120 and may include data from different sources (e.g., different sources among the data sources 130).

Each of the devices 120 may be, but is not limited to, a personal computer, a laptop, a tablet computer, a smartphone, a wearable computing device, or any other device capable of connecting to one or more networks such as the network 110.

The device attribute predictor 140 is configured to determine device attributes of the devices 120 based on data obtained from the data sources 130, from the devices 120, or a combination thereof. More specifically, the device attribute predictor 140 is configured to recursively partition device activity data with respect to optimal groupings of devices as described herein.

It should be noted that the device attribute predictor 140 is depicted as being deployed outside of the network environment 101 and the data sources 130 are depicted as being deployed in the network environment 101, but that these depictions do not necessarily limit any particular embodiments disclosed herein. For example, the device attribute predictor 140 may be deployed in the network environment 101, the data sources 130 may be deployed outside of the network environment 101, or both.

Figure 2:
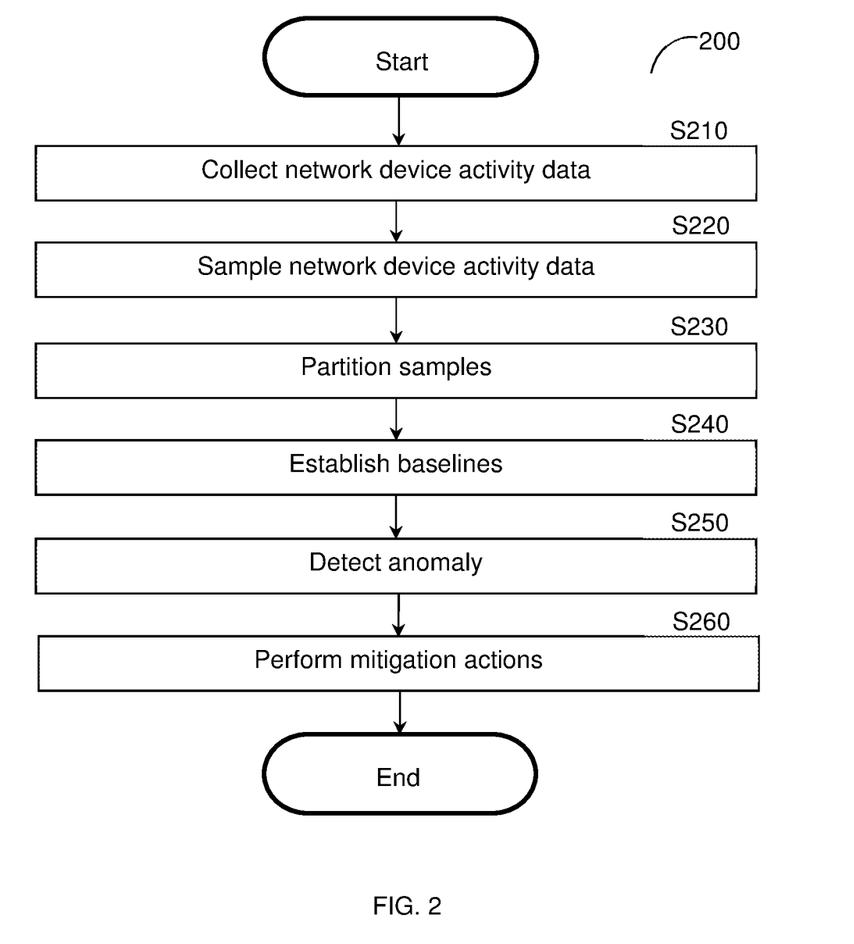
FIG. 2 is a flowchart illustrating a method for anomaly detection and mitigation using device subpopulation partitioning according to an embodiment.

FIG. 2 is a flowchart 200 illustrating a method for anomaly detection and mitigation using device subpopulation partitioning according to an embodiment. In an embodiment, the method is performed by the device attribute predictor 140, FIG. 1.

At S210, network device activity data is collected. The network device activity data is device activity data derived from data sent to or received by a device over one or more networks. The network device activity data may be collected, for example, from one or more data sources (e.g., the data sources 130, FIG. 1) with respect to multiple devices (e.g., the devices 120) that each communicate via one or more networks (e.g., the network 110). The network device activity data at least includes device attribute values representing purported device attributes for each device.

In an embodiment, the network device activity data includes data reflecting a feature space used by an anomaly detection model (i.e., a feature space including the features to which the anomaly detection model is applied in order to detect anomalies). For example, the network device activity data may include features used by the anomaly detection model that will be applied at S270 in order to detect anomalies.

In an embodiment, that data includes at least deterministic characteristics of devices such as, but not limited to, device attributes. The deterministic characteristics of devices are properties of the devices whose values do not change for any given device over time (i.e., a device having a particular device type does not have a different device type at a different point in time). The data may include non-deterministic information about devices such as data indicative of activities which reflect behavior of the devices that may vary over time (e.g., a device performing a certain activity at a particular time may perform a different activity or may perform the activity at a different frequency such that values representing those activities being performed may vary at different points in time).

At S220, the network device activity data is sampled.

In an embodiment, S220 includes performing stratified sampling over the feature space (e.g., a feature space including values representing deterministic characteristics such as device attributes) used by an anomaly detection model (e.g., the anomaly detection model to be applied at S250) which will be applied to the data once it is partitioned. Stratified sampling is a technique for sampling from a population which can be partitioned into subpopulations which involve dividing members of a population into homogenous subgroups referred to as stratums before sampling such that each element in the population is assigned to one and only one subgroup. When the population has been divided into homogenous subgroups, sampling (e.g., simple random sampling) may be applied within each stratum.

In a further embodiment, S220 may include identifying classes within the population and calculating a frequency of occurrence for each class within the population. Each class is a unique set of deterministic characteristics (e.g., device attribute values) representing devices having respective distinct combinations of device attributes. As a non-limiting example, a class may include all devices having a device type "A", a manufacturer "B", and a device model "C"; while another class includes all devices having a device type "X", a manufacturer "Y", and a device model "Z." The sampling may be performed with respect to the frequencies of the classes in order to ensure that all classes are represented in the samples based on their respective ratios within the population.

In some embodiments, S220 may include concatenating certain device attribute values represented in the device activity data. As a non-limiting example, device attribute values for device type, manufacturer, model, and data source may be concatenated. Sampling may be performed based on the concatenated data.

At S230, the samples are partitioned. In an embodiment, the samples are recursively partitioned as described below with respect to FIG. 3.

The samples are recursively partitioned with respect to device activity data of subpopulations of devices represented in the entire population of device activity data. At each recursion, a population or subpopulation is split with respect to a deterministic characteristic until each partition either at least meets a density metric threshold or is a cessation criteria is met (e.g., exhaustion of all potential device attributes by which a subpopulation may be further split, failure to meet a minimum threshold number of devices in the subpopulation, failure to meet a minimum threshold ratio of devices in the subpopulation relative to devices in the population, etc.). The splitting with respect to a deterministic characteristic is performed such that devices having a particular value for that deterministic characteristic (e.g., devices having the same manufacturer) are included among the same subpopulation and are not spread among different subpopulations created during that split.

In an embodiment, such a deterministic characteristic for a device is a device attribute such as model, manufacturer, type, source of data for the device, and the like. In a further embodiment, during each recursion, a distance matrix is generated for pairs of devices and used to calculate a split density metric which can be compared to a split density metric threshold in order to determine whether the density at least meets that threshold. When a subpopulation meets the split density metric threshold, the subpopulation is determined as valid and may be utilized for anomaly detection. If a subpopulation fails the split density metric threshold, the subpopulation may be further partitioned by splitting the subpopulation into further subpopulations and checking if each of the further subpopulations meets the split density metric threshold.

In a further embodiment, when potential partitioning has been exhausted such that no deterministic characteristic yields a density metric meeting the threshold after each deterministic characteristic has been partitioned as much as possible (e.g., subject to one or more requirements such as minimum number of devices required for a subpopulation to be valid), the relevant portion of device activity data including the failed subpopulations may be partitioned using mixture modeling. As a non-limiting example, a Gaussian Mixture Model may be applied to device activity data including such a failed subpopulation.

At S240, a baseline is established for each of the partitions based on the device activity data. The baseline establishes a normal or otherwise expected behavior for devices belonging to the group of devices represented in the partition such that deviations from the baseline indicate anomalous behavior which may reflect an underlying cyber threat. Such normal behavior may be learned, as a non-limiting example, via machine learning (e.g., by training a machine learning model to output anomalies based on device activity data).

In an embodiment, S240 includes establishing a baseline for each subpopulation determined as valid as discussed above with respect to FIG. 3. In this regard, each valid subpopulation serves as a context group that represents devices having common characteristics such that behavior of devices belonging to that context group which exhibit behavior that deviates from the baseline behavior established for the context group can be detected as abnormal behavior for that device. If any subpopulations created by splitting with respect to deterministic characteristics were not determined as valid after all potential partitioning had been performed, baselines may be established for groups of devices created by partitioning using a mixture model (e.g., the mixture model applied as discussed above with respect to S380).

At S250, an anomaly in device behavior is detected for one of the devices based on the baseline established for the partition including the device and device activity data of the device. In an embodiment, S250 includes monitoring device activity with respect to the established baselines in order to detect an anomaly in device behavior. In a further embodiment, S250 also includes determining an applicable subpopulation of devices which best represent the device (e.g., a subpopulation of devices reflected in one of the partitions) and comparing the device activity data for that device to the device activity data for the baseline for the partition corresponding to that subpopulation. To this end, S250 may include applying an anomaly identification model to features included among the device activity data with respect to the baseline of a partition corresponding to the device.

At S260, one or more mitigation actions are performed based on the detected anomaly. The mitigation actions may include, but are not limited to, severing communications between a device and one or more other devices or networks, generating an alert, sending a notification (e.g., to an administrator of a network environment), restricting access by the device, blocking devices (e.g., by adding such devices to a blacklist), combinations thereof, and the like. In some embodiments, devices having certain device attributes or combinations of device attributes may be blacklisted such that those device attributes are disallowed, and the mitigation actions may include blocking or severing communications with devices having the blacklisted device attributes.

Figure 3:
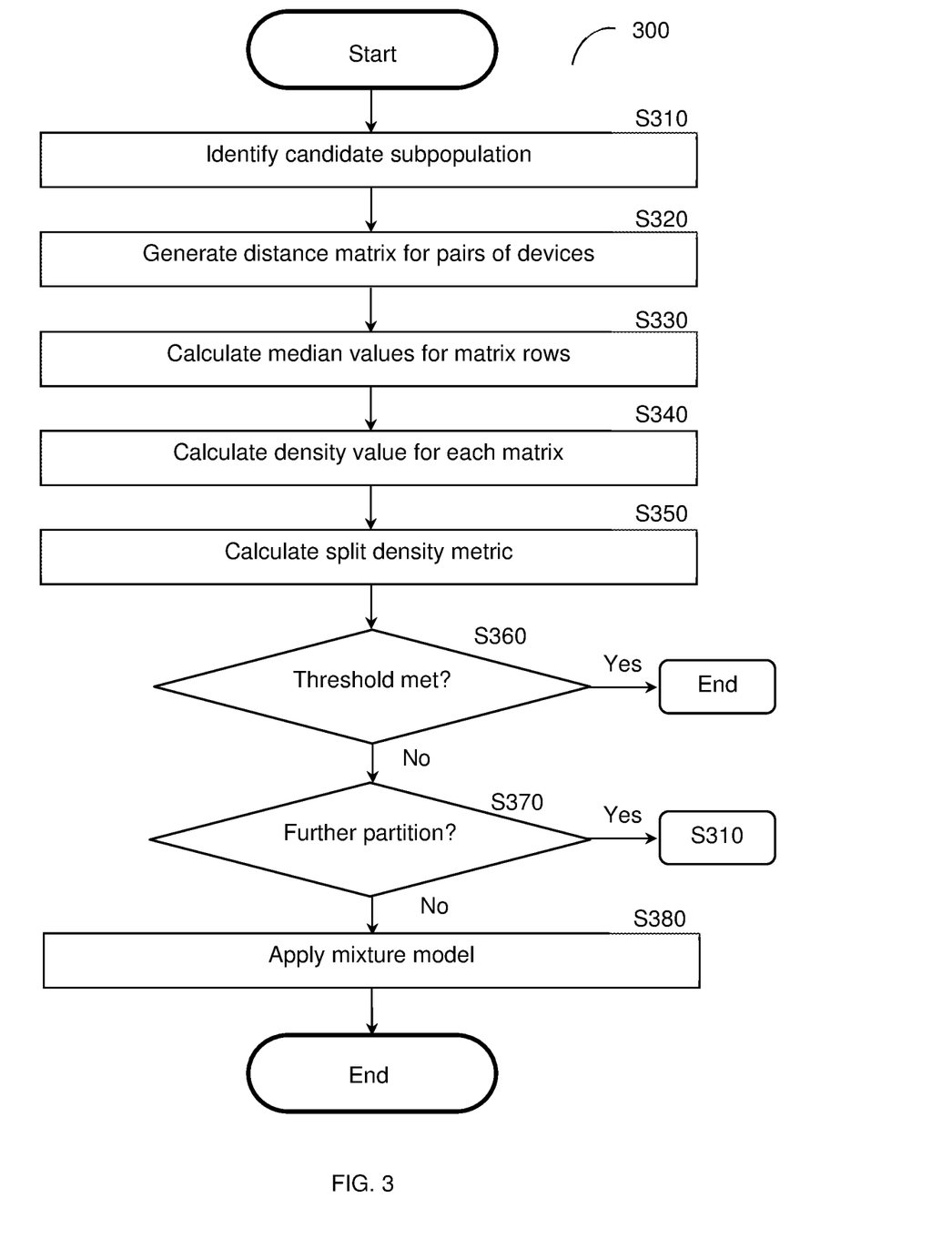
FIG. 3 is a flowchart illustrating a method for partitioning device activity data into subpopulations according to an embodiment.

FIG. 3 is a flowchart 300 illustrating a method for partitioning device activity data from a sample into subpopulations according to an embodiment.

At S310, a candidate subpopulation is identified from among a population of devices represented in a sample (e.g., devices having respective portions of device activity data among the sample). The identified candidate subpopulation is the subpopulation to be analyzed during the current iteration of the method of FIG. 3.

At each iteration of the method of FIG. 3, the candidate subpopulation is identified from among two or more candidate subpopulations. To this end, for any given iteration, S310 may include partitioning the population or subpopulation by splitting the population or a subpopulation into potential candidate subpopulations. Such splitting into candidate subpopulations may be performed, for example, based on center of mass. As a non-limiting example, a population including 100 devices may be split into a group of 30 devices as a first candidate subpopulation and a group of 70 devices as a second candidate subpopulation.

In some embodiments, the number of candidate subpopulations at each iteration may be defined with respect to potential unique values for a given splitting criterion (e.g., a device attribute such as device type). As a non-limiting example, the candidate subpopulations for an iteration where splitting is based on device type may include 24 distinct subpopulations, one for each potential device type each represented by a unique value.

In an embodiment, the candidate subpopulation is a subpopulation that was created by splitting a population or a subpopulation with respect to a deterministic characteristic (e.g., a particular device attribute indicated for devices in the population). At each iteration of the method of FIG. 3, the population or a subpopulation may be split into subpopulations. In other words, at a first iteration, the population is split into subpopulations, and during subsequent iterations for the same sample, a subpopulation may be split into further subpopulations (i.e., subpopulations that are a subset of the subpopulation that was split). An example demonstrating such splitting is depicted in and described further below with respect to FIG. 4. In a further embodiment, at each iteration where a subpopulation is further split, the subpopulation is split based on a deterministic characteristic that was not utilized for a previous iteration for the same sample.

In this regard, the evaluation of whether a given candidate subpopulation is sufficient (i.e., based on split density metric) also serves to determine whether splitting the population represented in a given sample with respect to a particular device attribute is an appropriate split to yield accurate normal device behavior. Consequently, if a particular candidate subpopulation passes at any given iteration, the characteristic (e.g., device attribute) based on which the population was split in order to yield that candidate subpopulation may be determined as an effective characteristic by which to split the population.

As noted below, candidate subpopulations may be split into further subpopulations as iterations proceed, for example, when a split density metric determined for a given candidate subpopulation is determined to fail the density metric threshold, that failed candidate subpopulation may be further split.

At S320, a distance matrix is generated for the candidate subpopulation. In an embodiment, the distance matrix represents one or more Mahalanobis distances and is determined based on an Inverse Covariance Matrix of features of the subpopulation. In a further embodiment, the Inverse Covariance Matrix is determined using the Minimum Covariance Determinant (MCD). The MCD is described in more detail in "A Fast Algorithm for the Minimum Covariance Determinant Estimator" by Peter J. Rousseuw and Katrien Van Driessen, the contents of which are hereby incorporated by reference. The result is a square matrix providing the covariance between each pair of elements (e.g., each pair of features) represented in a given random vector from among the candidate subpopulation, with each row or column representing a respective feature. The distance matrix contains all of the Mahalanobis distances between each pair of devices, with each row or column representing a respective device.

At S330, median distance values for matrix rows of the distance matrix are calculated.

That is, for each row of the distance matrix, a median value is determined. In an embodiment, the median distance values are calculated across the rows of the distance matrix (i.e., the median of each row).

At S340, a density value is calculated for the matrix based on the median values of the matrix rows for the matrix. In an embodiment, the density is determined as a median of the median values of the matrix rows determined at S330. The result is a scalar density value for the matrix and, consequently, the subpopulation for which the matrix was generated.

At S350, a split density metric is calculated for the subpopulation based on the density value and a coverage of a device attribute. In an embodiment, the split density metric is a function of the density value determined at S340 divided by a coverage value representing a coverage of the deterministic characteristic used for the split that created the subpopulation.

In a further embodiment, the coverage value is a ratio of non-empty groups of devices (e.g., subpopulations) having a particular deterministic characteristic (e.g., the device attribute used to split in order to create the current candidate subpopulation) which exceed a predetermined size threshold out of the total number of groups of devices (i.e., out of the total number of subpopulations which have been created). In this manner, the split density metric normalized deterministic characteristics with lower density and better coverage against characteristics with higher density and inferior coverage. In other words, deterministic characteristics having poor coverage will reduce the chance that the subpopulation will be validated and, conversely, deterministic characteristics having superior coverage will increase the chance that the subpopulation will be validated.

At S360, it is checked whether the current candidate subpopulation meets a density metric threshold and, if so, the current candidate subpopulation is determined as a valid subpopulation and execution terminates (i.e., no further partitioning of that subpopulation); otherwise, execution continues with S370 where it is checked whether further partitioning is possible. Valid subpopulations may be utilized during subsequent processing and, in particular, for establishing baselines used to detect anomalies in device behavior.

In an embodiment, the split density metric is calculated based on a density value where a higher value for the density metric represents a lower density and vice versa (i.e., a lower value represents a higher density). It is noted that higher density tends to reflect less variance for a given subpopulation. Accordingly, in such an embodiment, the split density metric meets the split density metric threshold when the split density metric is at or below the split density metric threshold, although the disclosed embodiments are not necessarily limited to implementations where density is represented such that higher density values represent lower densities and vice versa. When higher density values represent higher densities, the split density metric may meet the threshold when the split density metric is at or above the threshold.

At S370, it is determined whether further partitioning should be performed and, if so, execution continues with S310 where another partitioning is performed and a new candidate subpopulation is selected from among the resulting subpopulations; otherwise, execution continues with S380 where an alternative partitioning method is utilized.

In an embodiment, further partitioning is performed until one or more of the following cessation criteria is met: the subpopulation is determined to have a split density metric meeting the split density metric threshold, the subpopulation includes a number of devices below a minimum number of devices required for further partitioning (e.g., a predetermined number of devices), the subpopulation includes a ratio of devices out of the total devices of its respective population below a minimum ratio required for further partitioning (e.g., a predetermined ratio), or the subpopulation is the result of splitting a predetermined number of times (i.e., a predetermined maximum number of times a given population can be iteratively split as described above). In a further embodiment, this further partitioning may be performed using a mixture model as discussed below with respect to S380.

The next partitioning to be performed may be further partitioning of the current candidate subpopulation, or may be another partition of a population or portion thereof including the current candidate subpopulation (e.g., splitting that population or portion thereof with respect to a different device attribute). In this manner, partitioning may proceed until a candidate subpopulation split based on a particular deterministic characteristic is determined as valid or until all potential deterministic characteristics have been exhausted, i.e., until partitioning based on all potential deterministic characteristics has been performed such that the subpopulation created by splitting using each potential deterministic characteristic has been partitioned as much as effectively possible and has still not yielded a split density metric meeting a threshold.

In an embodiment, S370 includes determining whether there are sufficient devices represented in the current candidate subpopulation such that the current candidate subpopulation can be effectively partitioned further, and it is determined that the current candidate subpopulation should be partitioned further if there are sufficient devices represented in the current candidate subpopulation such that it can be effectively partitioned further. In a further embodiment, determining whether there are sufficient devices represented in the current candidate subpopulation includes checking whether a number or ratio of devices represented in the current candidate subpopulation is above a threshold (e.g., a predetermined threshold number of devices). If the number or ratio of devices represented in the current candidate subpopulation is at or above the threshold, it can be effectively partitioned further; otherwise, it cannot. In yet a further embodiment, whether sufficient devices are represented in the current candidate subpopulation may include applying a mixture model, for example a mixture model as described further below with respect to S380.

In this regard, it is noted that partitioning a population beyond a certain point such that there are not sufficient devices remaining in the group can result in groupings of devices which demonstrate a high degree of bias and therefore do not effectively represent behavior of devices having similar characteristics. As a non-limiting example, if a subpopulation consists of only two devices such that splitting the subpopulation further would result in two subpopulations each only including one device, the subpopulation may be determined as unable to be effectively partitioned further. In many implementations, a single device will be insufficient to effectively represent other devices, and multiple devices may also inaccurately reflect the behavior of other devices when the amount of devices in the subpopulation is a low number or is low relative to the amount of devices in the broader population from which the subpopulation was created.

At S380, when one or more samples failed the density metric threshold after the final iteration of partitioning by device attributes, those failed samples are split using a mixture model in order to create partitions for those samples. In other words, the failed samples are split into clusters, and those clusters may be utilized as the partitions for these samples during subsequent processing.

In an embodiment, the population or subpopulation is split into two subpopulations thereof at S380. By splitting into two subpopulations at each iteration where samples fail the density metric, anomaly detection using the resulting partitions are improved. More specifically, by splitting into only two subpopulations at a time, the minimal amount of splitting which yields sufficient density to accurately reflect behavior of the group may be yielded even when the potential subpopulations are not clear.

In an embodiment, S380 includes applying a mixture model or otherwise analyzing results of an applied mixture model. The mixture model is a clustering model used to represent the presence of subpopulations within an overall population in order to identify and extract the high scores cluster as one of those subpopulations. In an example implementation, extraction of the high scores cluster is performed using a Gaussian Mixture Model (GMM). More specifically, the GMM may be applied to a feature space of the device activity data in order to split the device activity data.

In this regard, it is noted that an unsupervised approach using a GMM is particularly useful for heterogenous subpopulations which inherently exhibit a wide spectrum of behavioral patterns. To this end, it has been identified that GMM can be applied to certain managed device types, even when the samples being analyzed share the same device attributes. Accordingly, using a GMM allows for extracting subpopulations that optimize mean and covariance metrics to split devices based on center of mass, which in turn allows for optimally extracting subpopulations to be used as partitions in the event that density-based partitioning does not yield adequate partitions for a given sample or portion of a sample.

Figure 4:
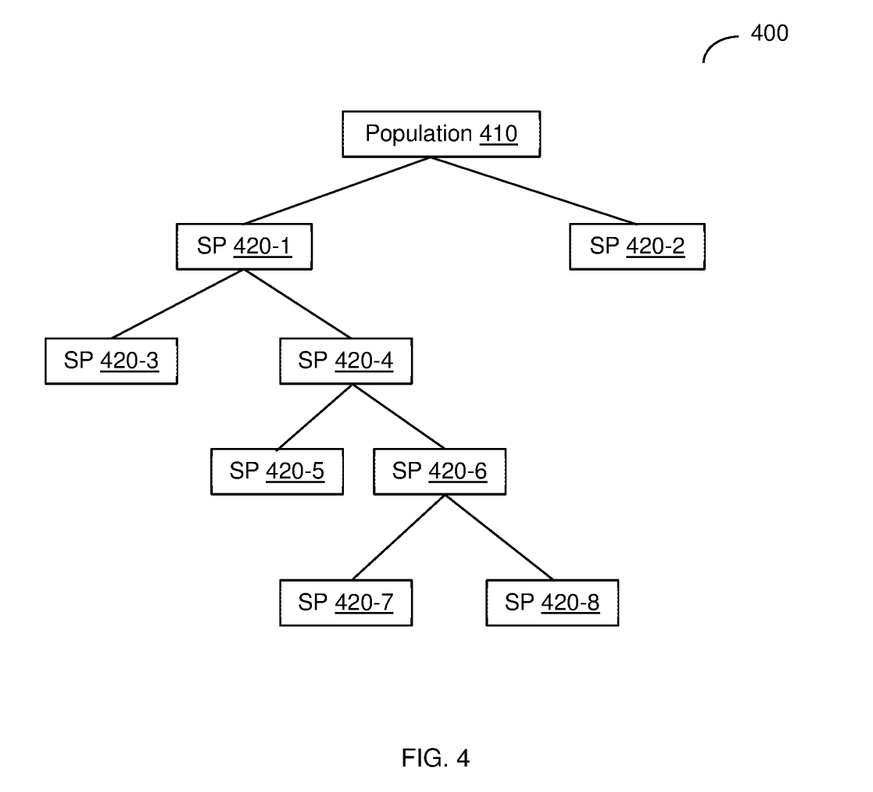
FIG. 4 is a partitioning diagram demonstrating an example partitioning of a sample.

FIG. 4 is a partitioning diagram 400 demonstrating a non-limiting example partitioning process in accordance with the method depicted in FIG. 3. The partitioning diagram 400 illustrates a population 410 of devices represented in a sample of device activity being partitioned into subpopulations (SPs) 420-1 through 420-8 through a series of iterations. It must be noted that the example partitioning depicted in FIG. 4 is used to describe a particular, non-limiting, example of partitioning which might occur and is used merely for illustrative purposes. FIG. 4 is not an exhaustive representation of all potential partitioning and is instead utilized to illustrate the process discussed in more detail above via examples of various partitions and further partitions as well as different circumstances that may lead to cessation of further partitioning for a given subpopulation.

As depicted in example FIG. 4, a population 410 is split at an initial iteration to yield partitions of data representing a first subpopulation 420-1 and a second subpopulation 420-2. In this example, the first subpopulation 420-1 fails the split density metric threshold (i.e., a split density metric calculated for the first subpopulation 420-1 does not meet the split density metric threshold) and therefore is further partitioned into third and fourth subpopulations 420-3 and 420-4, respectively, while the second subpopulation 420-2 meets the split density metric threshold. Consequently, the second subpopulation 420-2 is determined as a valid subpopulation and is not partitioned further.

The split into the subpopulations 420-1 and 420-2 is performed with respect to a first device attribute (e.g., device type), and the split of subpopulation 420-1 into further subpopulations 420-3 and 420-4 is performed with respect to a second device attribute (e.g., manufacturer). To this end, in this example, the first and second subpopulations 420-1 and 420-2 may represent devices having different device types, and each of the third and fourth subpopulations 420-3 and 420-4 may represent devices having different manufacturers but the same device type (e.g., the device type represented by the first subpopulation 420-1).

After the first split of subpopulation 420-1 into subpopulations 420-3 and 420-4, each of subpopulations 420-3 and 420-4 may be analyzed to determine a respective split density metric and to determine, based on the respective split density metric, whether each of the subpopulations 420-3 and 420-4 meets the split density metric threshold. In accordance with the example depicted in FIG. 4, subpopulation 420-3 may meet the threshold such that it is determined as a valid subpopulation and no further partitioning of subpopulation 420-3 is performed, while the subpopulation 420-3 is determined as an invalid subpopulation and is further partitioned into subpopulations 420-5 and 420-6 with respect to a third device attribute (e.g., device model).

In a further example, the subpopulation 420-5 represents 10 devices (i.e., the partition corresponding to this subpopulation includes device activity from 10 devices) and the subpopulation 420-6 represents 40 devices. When a minimum threshold number of devices required for a subpopulation to be further partitioned is 20 devices, subpopulation 420-5 may be determined as an invalid subpopulation but no further partitioning is performed on subpopulation 420-5 with respect to deterministic characteristics. In that case, subpopulation 420-5 may be ignored during subsequent processing.

In this example, subpopulation 420-6 meets the minimum threshold for number of devices to be partitioned further and also fails the split density metric threshold. Accordingly, subpopulation 420-6 is further partitioned into subpopulations 420-7 and 420-8 with respect to a fourth device attribute (e.g., data source). In an example where only four potential device attributes are used for splitting, the subpopulations 420-7 and 420-8 cannot be further split. If either of the subpopulations 420-7 or 420-8 fails the split density metric threshold, the most recent prior subpopulation 420-6 may be split using an alternative method (e.g., by applying a mixture model) to result in further subpopulations (not shown).

It is again noted that the particular splitting and cessation of partitioning illustrated in FIG. 4 is merely an example, and that the particular split depicted in FIG. 4 does not limit any of the disclosed embodiments.

Figure 5:
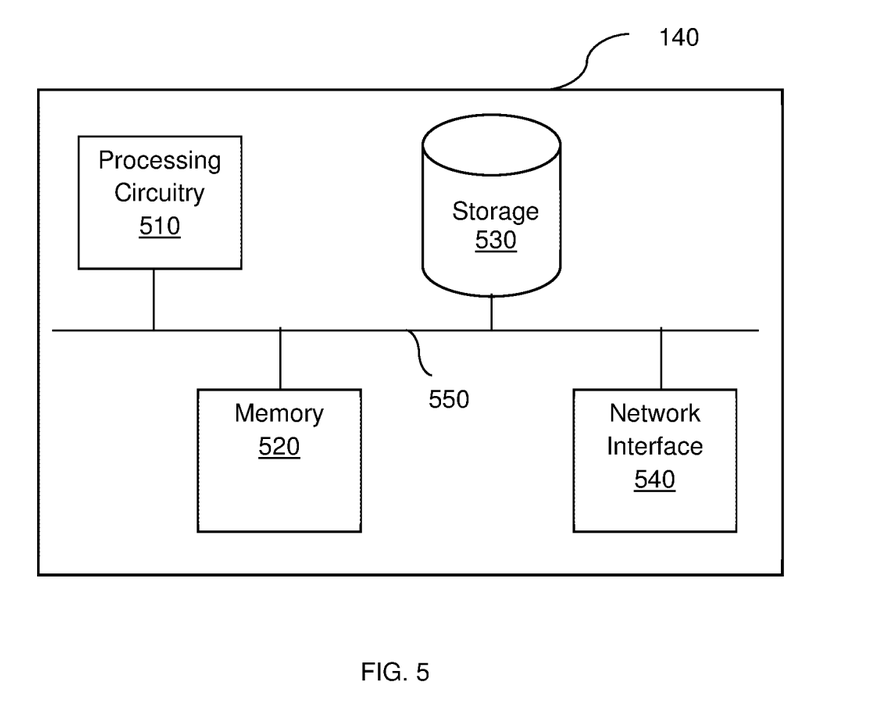
FIG. 5 is a schematic diagram of a device attribute predictor according to an embodiment.

FIG. 5 is an example schematic diagram of a device attribute predictor 140 according to an embodiment. The device attribute predictor 140 includes a processing circuitry 510 coupled to a memory 520, a storage 530, and a network interface 540. In an embodiment, the components of the device attribute predictor 140 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the device attribute predictor 140 to communicate with, for example, the data sources 130.

It should be understood that the embodiments described herein are not limited to the specific architecture illustrated in FIG. 5, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for anomaly detection using device subpopulation partitioning, comprising:
   recursively partitioning a sample of device activity data over a plurality of iterations in order to create a plurality of partitions, wherein the device activity data includes deterministic characteristics of a population including a plurality of devices, wherein each iteration of recursively partitioning the sample further comprises:
      determining a split density metric for a candidate subpopulation of a plurality of subpopulations, wherein each of the plurality of subpopulations is created by splitting at least a portion of the population with respect to a corresponding type of deterministic characteristic, wherein the split density metric for the candidate subpopulation is determined based on a density value of the candidate subpopulation and a coverage value of the corresponding type of deterministic characteristic; and
      checking whether the candidate subpopulation meets a split density metric threshold by comparing the split density metric for the candidate subpopulation to the split density metric threshold, wherein the plurality of partitions includes each candidate subpopulation that meets the split density metric threshold;
   establishing a baseline for each of the plurality of partitions, wherein the baseline established for each partition is determined based on device activity for devices represented in a portion of the device activity data of the partition; and
   detecting an anomaly based on behavior of a device and the baseline established for a partition corresponding to the device.

2. The method of claim 1, further comprising:
   identifying at least one failed subpopulation of the plurality of subpopulations having a split density metric which fails the split density metric threshold; and
   creating at least one clustering partition by applying a clustering model to at least one portion of the device activity data corresponding to devices of the at least one failed subpopulation, wherein the plurality of partitions includes the at least one clustering partition.

3. The method of claim 2, wherein the clustering model is a Gaussian mixture model.

4. The method of claim 1, wherein the candidate subpopulation at each iteration is selected from among a plurality of candidate subpopulations for the iteration, wherein the plurality of candidate subpopulations for each iteration represents a plurality of distinct values for the corresponding type of deterministic characteristic of the iteration.

5. The method of claim 1, further comprising:
   identifying at least one failed subpopulation of the plurality of subpopulations for which all potential types of deterministic characteristics have been exhausted, wherein the potential types of deterministic characteristics are a predetermined set of types of characteristics to be used for partitioning the population, wherein all potential types of deterministic characteristics have been exhausted for a failed subpopulation of the plurality of subpopulations when the failed subpopulation was created by splitting the device activity data once using each of the potential types of deterministic characteristics; and
   creating at least one clustering partition by applying a clustering model to at least one portion of the device activity data corresponding to devices of the at least one failed subpopulation, wherein the plurality of partitions includes the at least one clustering partition.

6. The method of claim 1, wherein determining the split density metric for the candidate subpopulation at each iteration further comprises:
   generating a distance matrix for the candidate subpopulation, wherein the density value is determined based on the distance matrix.

7. The method of claim 6, wherein the distance matrix includes a plurality of rows, wherein determining the split density metric for the candidate subpopulation at each iteration further comprises:
   determining a plurality of median distance values for the plurality of rows, wherein the density value is determined based on the plurality of median distance values.

8. The method of claim 7, wherein the density value determined for the candidate subpopulation at each iteration is determined as a median of the plurality of median distance values.

9. The method of claim 1, further comprising:
   performing at least one mitigation action with respect to the detected anomaly.

10. A non-transitory computer readable medium having stored thereon instructions for causing a processing circuitry to execute a process, the process comprising:
    recursively partitioning a sample of device activity data over a plurality of iterations in order to create a plurality of partitions, wherein the device activity data includes deterministic characteristics of a population including a plurality of devices, wherein each iteration of recursively partitioning the sample further comprises:
   determining a split density metric for a candidate subpopulation of a plurality of subpopulations, wherein each of the plurality of subpopulations is created by splitting at least a portion of the population with respect to a corresponding type of deterministic characteristic, wherein the split density metric for the candidate subpopulation is determined based on a density value of the candidate subpopulation and a coverage value of the corresponding type of deterministic characteristic; and
   checking whether the candidate subpopulation meets a split density metric threshold by comparing the split density metric for the candidate subpopulation to the split density metric threshold, wherein the plurality of partitions includes each candidate subpopulation that meets the split density metric threshold;
establishing a baseline for each of the plurality of partitions, wherein the baseline established for each partition is determined based on device activity for device represented in a portion of the device activity data of the partition; and
detecting an anomaly based on behavior of a device and the baseline established for a partition corresponding to the device.

11. A system for anomaly detection using device subpopulation partitioning, comprising:
   a processing circuitry; and
   a memory, the memory containing instructions that, when executed by the processing circuitry, configure the system to:
      recursively partition a sample of device activity data over a plurality of iterations in order to create a plurality of partitions, wherein the device activity data includes deterministic characteristics of a population including a plurality of devices, wherein the system is further configured to, at each iteration:
         determine a split density metric for a candidate subpopulation of a plurality of subpopulations, wherein each of the plurality of subpopulations is created by splitting at least a portion of the population with respect to a corresponding type of deterministic characteristic, wherein the split density metric for the candidate subpopulation is determined based on a density value of the candidate subpopulation and a coverage value of the corresponding type of deterministic characteristic; and
         check whether the candidate subpopulation meets a split density metric threshold by comparing the split density metric for the candidate subpopulation to the split density metric threshold, wherein the plurality of partitions includes each candidate subpopulation that meets the split density metric threshold;
      establish a baseline for each of the plurality of partitions, wherein the baseline established for each partition is determined based on device activity for devices represented in a portion of the device activity data of the partition; and
      detect an anomaly based on behavior of a device and the baseline established for a partition corresponding to the device.

12. The system of claim 11, wherein the system is further configured to:
   identify at least one failed subpopulation of the plurality of subpopulations having a split density metric which fails the split density metric threshold; and
   create at least one clustering partition by applying a clustering model to at least one portion of the device activity data corresponding to devices of the at least one failed subpopulation, wherein the plurality of partitions includes the at least one clustering partition.

13. The system of claim 12, wherein the clustering model is a Gaussian mixture model.

14. The system of claim 11, wherein the candidate subpopulation at each iteration is selected from among a plurality of candidate subpopulations for the iteration, wherein the plurality of candidate subpopulations for each iteration represents a plurality of distinct values for the corresponding type of deterministic characteristic of the iteration.

15. The system of claim 11, wherein the system is further configured to:
   identify at least one failed subpopulation of the plurality of subpopulations for which all potential types of deterministic characteristics have been exhausted, wherein the potential types of deterministic characteristics are a predetermined set of types of characteristics to be used for partitioning the population, wherein all potential types of deterministic characteristics have been exhausted for a failed subpopulation of the plurality of subpopulations when the failed subpopulation was created by splitting the device activity data once using each of the potential types of deterministic characteristics; and
   create at least one clustering partition by applying a clustering model to at least one portion of the device activity data corresponding to devices of the at least one failed subpopulation, wherein the plurality of partitions includes the at least one clustering partition.

16. The system of claim 11, wherein the system is further configured to:
   generate a distance matrix for the candidate subpopulation at each iteration, wherein the density value for each iteration is determined based on the distance matrix generated at the iteration.

17. The system of claim 16, wherein the system is further configured to:
   determine a plurality of median distance values for the plurality of rows of the distance matrix generated at each iteration, wherein the density value for each iteration is determined based on the plurality of median distance values determined for the distance matrix for the iteration.

18. The system of claim 17, wherein the density value determined for the candidate subpopulation at each iteration is determined as a median of the plurality of median distance values.

19. The system of claim 11, wherein the system is further configured to:
   perform at least one mitigation action with respect to the detected anomaly.

* * * * *